(12) United States Patent
Gasthaus et al.

(10) Patent No.: US 11,675,646 B2
(45) Date of Patent: Jun. 13, 2023

(54) SYSTEMS, APPARATUSES, AND METHODS FOR ANOMALY DETECTION

(71) Applicant: Amazon Technologies, Inc., Seattle, WA (US)

(72) Inventors: Jan Gasthaus, Munich (DE); Mohamed El Fadhel Ayed, Berlin (DE); Lorenzo Stella, Berlin (DE); Tim Januschowski, Berlin (DE)

(73) Assignee: Amazon Technologies, Inc., Seattle, WA (US)

( * ) Notice: Subject to any disclaimer, the term of this patent is extended or adjusted under 35 U.S.C. 154(b) by 365 days.

(21) Appl. No.: 16/912,312

(22) Filed: Jun. 25, 2020

(65) Prior Publication Data

US 2021/0406671 A1 Dec. 30, 2021

(51) Int. Cl.
G06F 11/07 (2006.01)
G06F 16/23 (2019.01)
G06F 40/20 (2020.01)
G06F 11/22 (2006.01)

(52) U.S. Cl.
CPC ........ *G06F 11/079* (2013.01); *G06F 11/0793* (2013.01); *G06F 11/2263* (2013.01); *G06F 16/2379* (2019.01); *G06F 40/20* (2020.01)

(58) Field of Classification Search
CPC .... G06F 11/07; G06F 11/2263; G06F 11/079; G06F 11/3447; G06F 11/3419; G06F 11/302; G06F 11/0709; G06F 11/3006; G06F 11/0793; H04L 41/0631; H04L 41/064; G05B 23/0275
See application file for complete search history.

(56) References Cited

U.S. PATENT DOCUMENTS

| | | | |
|---|---|---|---|
| 7,490,073 B1 | 2/2009 | Qureshi et al. | |
| 8,438,129 B1* | 5/2013 | Przytula | G06N 7/005 |
| | | | 706/52 |
| 8,949,677 B1* | 2/2015 | Brundage | G06F 11/0745 |
| | | | 714/48 |
| 10,289,441 B1* | 5/2019 | Chopra | G06F 11/301 |
| 2003/0014692 A1 | 1/2003 | James et al. | |

(Continued)

FOREIGN PATENT DOCUMENTS

| | | |
|---|---|---|
| WO | 02/73351 A2 | 9/2002 |
| WO | 2016/191639 A1 | 12/2016 |

OTHER PUBLICATIONS

Aue, Alexander et al., On the prediction of stationary functional time series, arXiv:1208.2892v4 (2014), 36 pgs., https://arxiv.org/pdf/1208.2892.pdf.

(Continued)

*Primary Examiner* — Yolanda L Wilson
(74) *Attorney, Agent, or Firm* — Nicholson De Vos Webster & Elliott LLP

(57) ABSTRACT

Techniques for anomaly detection are described. An exemplary method includes receiving a request to monitor for anomalies from one or more data sources; analyzing time-series data from the one or more data sources; generating a recommendation for handling the determined anomaly, the recommendation generated by performing one or more of a root cause analysis, a heuristic analysis, and an incident similarity analysis; and reporting the anomaly and recommendation.

20 Claims, 11 Drawing Sheets

(56) References Cited

U.S. PATENT DOCUMENTS

| | | | | |
|---|---|---|---|---|
| 2014/0080447 | A1* | 3/2014 | Janakiraman | H04W 24/08 455/411 |
| 2019/0065298 | A1* | 2/2019 | Leverich | G06F 11/0709 |
| 2019/0129779 | A1* | 5/2019 | Adamson | G06F 11/079 |
| 2019/0155672 | A1* | 5/2019 | Wang | G06F 11/0709 |
| 2019/0324831 | A1 | 10/2019 | Gu | |

OTHER PUBLICATIONS

Bosq, D., Linear processes in function spaces: theory and applications, Springer (2000), 279 pgs., https://vdoc.pub/documents/linear-processes-in-function-spaces-theory-and-applications-56d2sl71inf0.

Caron, F. et al., Bayesian Inference for Linear Dynamic Models with Dirichlet Process Mixtures, (2007), 26 pgs., https://arxiv.org/pdf/math/0702225.pdf.

Chang, Yoosoon et al., Evaluating trends in time series of distributions: A spatial fingerprint of human effects on climate, Journal of Econometrics (2020), pp. 274-294, vol. 214.

Chang, Yoosoon et al., Nonstationarity in Time Series of State Densities, Journal of Econometrics (2016), 37 pgs.

Ferraty, Frederic and Vieu, Philippe, Nonparametric Functional Data Analysis: Theory and Practice, Springer Science+Business Media, Inc. (2006), (book) 280 pgs.

Flaxman, Seth et al., Bayesian Learning of Kernel Embeddings, arXiv:1603.02150v2 (2016), 19 pgs., https://arxiv.org/pdf/1603.02160.pdf.

Flaxman, Seth R. et al., Who Supported Obama in 2012? Ecological Inference through Distribution Regression, Proceedings of the 21th ACM SIGKDD International Conference on Knowledge Discovery and Data Mining (2015), 10 pgs., https://www.sethrf.com/files/ecological.pdf.

Harrison, P. J. and Stevens, C.F., Bayesian Forecasting, Journal of the Royal Statistical Society (1976), pp. 205-228, vol. 3, https://rss.onlinelibrary.wiley.com/doi/epdf/10.1111/j.2517-6161.1976.tb01586.x.

Horvath, Lajos and Kokoszka, Piotr, Inference for Functional Data with Applications, Springer Science+Business Media (2012), (book) 426 pgs.

Hyndman, Rob J. and Shang, Han Lin, Functional time series forecasting, Preprint submitted to Journal of the Korean Statistical Society (Jun. 12, 2009), 25 pgs.

Hyndman, Rob J. and Ullah, Md Shahid, Robust forecasting of mortality and fertility rates: a functional data approach, (2005), 4 pgs., https://robjhyndman.com/papers/isi2005.pdf.

Hyndman, Rob J., Computing and Graphing Highest Density Regions, The American Statistician (May 1996), pp. 120-126, vol. 50 / No. 2.

Kokoszka, Piotr et al., Forecasting of density functions with an application to cross-sectional and intraday returns, International Journal of Forecasting (2019), pp. 1304-1317, vol. 35.

Kou, Connie Khor Li et al., A Compact Network Learning Model for Distribution Regression, arXiv:1804.04775v3 (2018), 18 pgs., https://arxiv.org/pdf/1804.04775.pdf.

Law, Ho Chung Leon et al., Bayesian Approaches to Distribution Regression, AIStats (2018) Proceedings of Machine Learning Research (PMLR), 10 pgs., vol. 84, http://proceedings.mlr.press/v84/law18a/law18a.pdf.

Li, Rui et al., Deep Distribution Regression, arXiv:1903.06023v1 (2019), 19 pgs., https://arxiv.org/pdf/1903.06023.pdf.

Mena, Ramses H. and Ruggiero, Matteo, Dynamic density estimation with diffusive Dirichlet mixtures, Bernoulli (2016), pp. 901-926, vol. 22.

Muandet, Krikamol et al., Learning from Distributions via Support Measure Machines, Advances in neural information processing systems (2012), 9 pgs., https://proceedings.neurips.cc/paper/2012/file/9bf31c7ff062936a96d3c8bd1f8f2ff3-Paper.pdf.

Ntampaka, M. et al., Dynamical Mass Measurements of Contaminated Galaxy Clusters Using Machine Learning, The Astrophysical Journal, 831:135 (2016), 16 pgs.

Oliva, Junier B. et al., Distribution to Distribution Regression, Proceedings of the 30th International Conference on Machine Learning (2013), JMLR:W&CP vol. 28, 9 pgs., http://proceedings.mlr.press/v28/oliva13.pdf.

Park, Joon Y. and Qian, Junhui, Functional Regression of Continuous State Distributions, (2008), 33 pgs., https://citeseerx.ist.psu.edu/viewdoc/download?doi=10.1.1.583.7137&rep=rep1&type=pdf.

Poczos, Barnabas et al., Distribution-Free Distribution Regression, AIStats (2013), pp. 507-515, vol. 31 of JMLR: W&CP 31, https://proceedings.mlr.press/v31/poczos13a.html.

Ramsay, J.O. and Silverman, B.W., Functional Data Analysis Second Edition, Springer Science+Business Media, Inc. (2005), (book) 430 pgs.

Rodriguez, Abel et al., Bayesian Dynamic Density Estimation, Bayesian Analysis (2008), pp. 339-366, vol. 3 / No. 2.

Salinas, David et al., DeepAR: Probabilistic Forecasting with Autoregressive Recurrent Networks, arXiv:1704.04110v3 (2019), 12 pgs., https://arxiv.org/pdf/1704.04110.pdf.

Szabo, Zoltan et al., Learning Theory for Distribution Regression, Journal of Machine Learning Research (2016), pp. 1-40, vol. 17, https://www.jmlr.org/papers/volume17/14-510/14-510.pdf.

Tijms, Henk C., A First Course in Stochastic Models, John Wiley and sons, 2003, (book) 491 pgs.

West, Mike et al., Dynamic Generalized Linear Models and Bayesian Forecasting, Journal of the American Statistical Association (Mar. 1985), pp. 73-83, vol. 80 / No. 389.

International Search Report and Written Opinion, PCT App. No. PCT/US2021/038972, dated Oct. 28, 2021, 19 pages.

* cited by examiner

SYSTEMS, APPARATUSES, AND METHODS FOR ANOMALY DETECTION

BACKGROUND

In large-scale distributed systems or cloud environments, the detection of anomalous events allows operators to detect and understand operational issues and facilitates swift troubleshooting. Undetected anomalies can result in potentially significant losses and can impact customers of these systems and services negatively. Designing an effective anomaly detection system is therefore an important task. This task entails significant challenges, beginning with the fact that the problem is usually ill-posed. The notion of anomaly is itself ambiguous as it is used for different events in various domains, with applications in healthcare, logistics, fashion or finance for exam involving a high degree of subjectivity.

BRIEF DESCRIPTION OF DRAWINGS

Various embodiments in accordance with the present disclosure will be described with reference to the drawings, in which.

DETAILED DESCRIPTION

The present disclosure relates to methods, apparatus, systems, and non-transitory computer-readable storage media for detecting anomalies. According to some embodiments, the anomaly detection is based on modeling time series of probability distributions over real values (or vectors).

In some embodiments, an anomaly detection service may be used to monitor data (e.g., logs, events, and metrics) to determine anomalous behavior and generate alarms and/or recommendations to allow for a root cause to be addressed. In some embodiments, a new methodology for detecting anomalies in time series data, with a primary application to monitoring the health of (micro-) services and cloud resources is described. Instead of modeling time series consisting of real values or vectors of real values, time series of probability distributions over real values (or vectors) is modeled. This extension to time series of probability distributions allows the technique to be applied to the common scenario where the data is generated by requests coming into a service, which is then aggregated at a fixed temporal frequency.

In the setting of cloud monitoring, it is important to be able to efficiently detect an anomalous event in the context of streaming data. The fundamental difficulties that any anomaly detection system has to face are threefold. First, due to the amount of data and its streaming nature, it is uncommon to be provided with labels or ground truth in industrial applications. Even if labels are available, due to the subjectivity of the task, labels may not represent a ground truth as often assumed. This raises the need for unsupervised models. Second, the monitoring systems have to track the evolution of numerous time-series simultaneously, which often leads to a considerable flow of data to process in near real-time, so the models have to scale efficiently to the amount of data available. Here, scalability comes not only in the traditional flavor of computational scalability but also in terms of the need to involve experts to tune the systems. With millions of metrics to be monitored, approaches are required that can process the data fast enough and that have a robust out-of-the-box experience. Finally, the approaches have to be flexible in order to handle time-series of different nature (for example CPU usage, latency, number of users), and anomalies presenting a wide range of patterns (point anomalies, collective anomalies, abrupt changes in trend, etc.).

Figure 1:
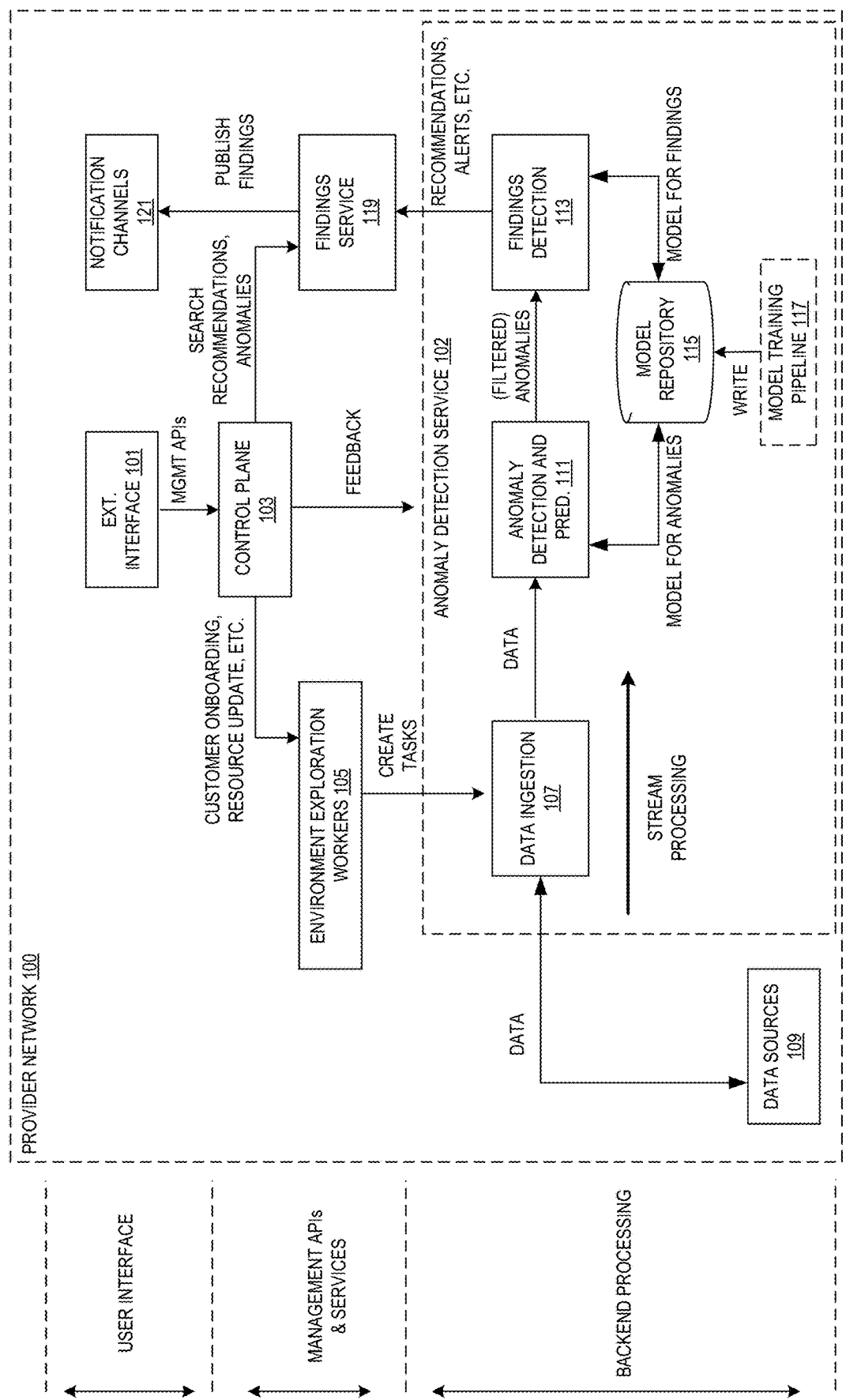
FIG. 1 illustrates embodiments of a system to be utilized to find anomalies in data.

The anomaly detection approach based on distributional time series models that addresses all three challenges. This approach embraces the data generation process by considering the entire distribution of the measurements within each time unit. This means considering time-series of equally spaced "points" in time, but where each "point" is a probability distribution, called a distributional data point. This is in contrast to most classical anomaly detection settings that involve time-series of points FIG. 1 illustrates embodiments of a system to be utilized to find anomalies in data. In some embodiments, this system includes an anomaly detection service 102 of a provider network 100. However, the components illustrated may be standalone or not included as a service offering.

In this illustration, there are three different aspects that may be utilized to provide anomaly detection (and, in some embodiments, reporting). A user interface aspect allows for a user to configure the anomaly detection service 102 through an external interface 101. This interface provides a plurality of management application programming interface (API) functions that allow a user to talk to a control plane 103 which generally includes administrative operations, such as system configuration and management. One or more notification channels 121 provide results of anomaly detection back to a user. For example, a notification channel may be a user interface, an email, a message, etc.

In some embodiments, the external interface 101 receives user feedback to that flows through the control plane 103 to the anomaly detection service 102 to be used to improve the anomaly detection service 102.

A management API and services aspect is managed from the control plane 103. For example, user onboarding, resource allocation, etc. may be performed using the control plane 103. Environment exploration workers 105 are allocable resources that create tasks to be performed by the anomaly detection service 102 such as to ingest data, perform anomaly detection, and perform a recommendation, etc. detection on the anomalies.

A findings service 119 sends alerts for incidents identified, stores and serves actions, recommendations and alerts, initiates actions in external services such as ticketing systems and deployment rollback, and/or initiates actions with other provider network 100 services. Searches of the finding service 119 for recommendations and/or anomalies may be made through the control plane 103.

This detection allows for a reduction in application disruptions by automatically detecting operational incidents, improving remediation time, identifying operational risks, and enabling engineers to focus on innovative work rather than incident response.

The backend processing aspect includes components or services to perform anomaly detection and finding detection. In some embodiments, this is performed by the anomaly detection service 102.

Data sources 109 provide the data to analyze. Exemplary sources include logs, events, metrics, etc. The data sources 109 may be streaming sources (e.g., continually providing data) or sources that batch data to be analyzed in bulk. Data sources 109 may include sources that are unique to a particular user and/or sources that are shared across users.

A data ingestion component/service 107 receives data from the data sources 109. The data ingestion component/service 107 pre-processes data (including events) by performing one or more of extracting relevant features, aggregating data, and/or performing seasonality detection. In some embodiments, both raw (aggregated) streams and pre-processed data (e.g., time-stream data) are stored. Examples of data processed include metrics, logs, external events, internal events, configuration settings, etc. After ingestion, the raw streams and pre-processed data are available for use by an anomaly detection/prediction (e.g., scoring) inference component.

The anomaly detection/prediction component/service 111 utilizes one or more anomaly detection machine learning models to analyze the streams of data to determine potential anomalies that are scored and generate events and/or alerts. In some embodiments, clustering models remove potential anomaly duplicates and combine anomalies into distinct incidents. The anomaly detection/prediction component/service 111 may also use ingested historic data and metadata to make this detection. Metadata may include application metadata, user metadata, and application call graphs.

A findings detection service 113 determines recommendations, alerts, etc. and/or root causes from the output of the anomaly detection/prediction component/service 111 and/or the time-series data.

Each recommendation includes relevant contextual information (e.g., metrics, graphs and logs) and a suggested action. For example, in some embodiments, a recommendation includes a pointer to the specific logs, events, and metrics that triggered the monitoring rule or that was detected by a machine learning model. Some recommendations are urgent and reactive, as when there is a recommendation to investigate an operational incident. Other recommendations are proactive and include preventive actions such as adding a custom alarm. Recommendations are available through the external interface 101.

Examples of detections and recommendations include, but are not limited to: a web application that begins to exhibit elevated latency that is considered above normal operating patterns with a recommendation to investigate a code deployment highlighted as a possible root cause; a maintenance update to a database which causes unusual behavior and intermittent webserver errors for an application that depends on it with a recommendation to perform an investigation and a suggestion of the database maintenance update as a possible root cause; etc.

In some embodiments, the anomaly detection service 102 does not manage or retain user operational data. When ingesting and analyzing operational data, the data is may be encrypted in transit and at rest.

In some embodiments, aspects of models for the findings detection 113 and the anomaly detection/prediction component/service 111 are stored in a model repository 115. For example, metric specific model parameters, scoring information (for evaluating performance of production models to check when they need retraining), labels and feedback, etc. are stored. Additionally, in some embodiments, these models are trainable using a model training pipeline 117.

A provider network 100 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) may be part of, or serve as a front-end to, a control plane 103 of the provider network 100 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code—typically without the user having any control of or knowledge of the underlying compute instance(s) involved.

For example, in various embodiments, a "serverless" function may include code provided by a user or other entity—such as the provider network itself—that can be executed on demand. Serverless functions may be maintained within provider network 100 by an on-demand code execution service and may be associated with a particular user or account or be generally accessible to multiple users/accounts. A serverless function may be associated with a Uniform Resource Locator (URL), Uniform Resource Identifier (URI), or other reference, which may be used to invoke the serverless function. A serverless function may be executed by a compute instance, such as a virtual machine, container, etc., when triggered or invoked. In some embodiments, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some embodiments, these resources may be maintained in a "ready" state (e.g., having a pre-initialized runtime environment configured to execute the serverless functions), allowing the serverless functions to be executed in near real-time.

Figure 2:
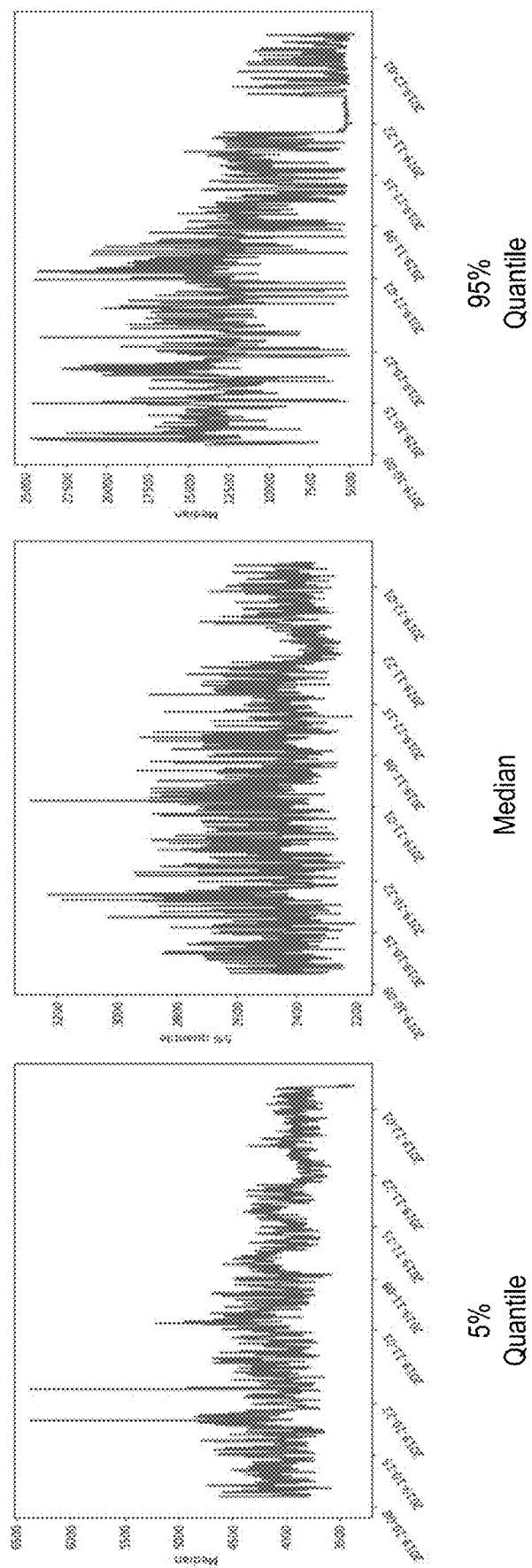
FIG. 2 illustrates an example of summary statistics with quantiles.

FIG. 2 illustrates an example of summary statistics with quantiles. In the metrics that modern compute systems emitted by compute systems are based on a stream of events where each event is a tuple consisting of a timestamp and a measurement. A measurement is triggered at every user interaction with the service. As an illustration, one can think of a time series representing the latency of a system as a series of events whenever a user queries a certain service. In the context of monitoring popular services, one can easily end up with several hundreds of thousands of measurements per minute. To facilitate data handling, the typical anomaly detection pipeline starts with an aggregation step in order to recover the classical, equally spaced time-series setting, which represents a challenge on its own. The aggregation of events requires choosing a meaningful statistic which will summarize all measurements within every time unit while allowing detection of abnormal behaviors. Commonly used summary statistics are specific quantiles, for example the median. However, such a choice is ultimately arbitrary and exposes to the risk of missing anomalies. In this illustration, there are three different quantiles of the same real-world latency metric of a service. From this illustration, it should be apparent that in this style of anomaly detection the quantile choice is extremely important. In this example, monitoring the median or the 5%, would miss the anomaly that only appears in the 95% quantile.

In some embodiments, the anomaly detection/prediction component/service 111 considers an entire distribution of the measurements within each time unit. This means considering time-series of equally spaced "points" in time, but where each "point" is a probability distribution, called a distributional data point. This is in contrast to most classical anomaly detection settings that involve time-series of points space equally in time and do not take the data generation process further into consideration.

As such, in some embodiments, the anomaly detection/prediction component/service 111 aggregates the observations at a more meaningful time granularity, but instead of arbitrarily choosing an aggregated statistic, the marginal distributions of the observations within each aggregated time period are chosen. Then, within the aggregated time unit, n samples from the underlying distribution are gather. As an illustration, consider time-series with a minute frequency. If aggregated hourly, this yields 60 observations per aggregated time unit. This approach predicts the distribution of the observations for the hour to come. Then, at the mth minute of that hour, a computation of the likelihood of the current observation is made, which is used to determine if it is anomalous or not. The joint likelihood of the past m observations in the hour can be made and used to detect collective anomalies.

Figure 3:
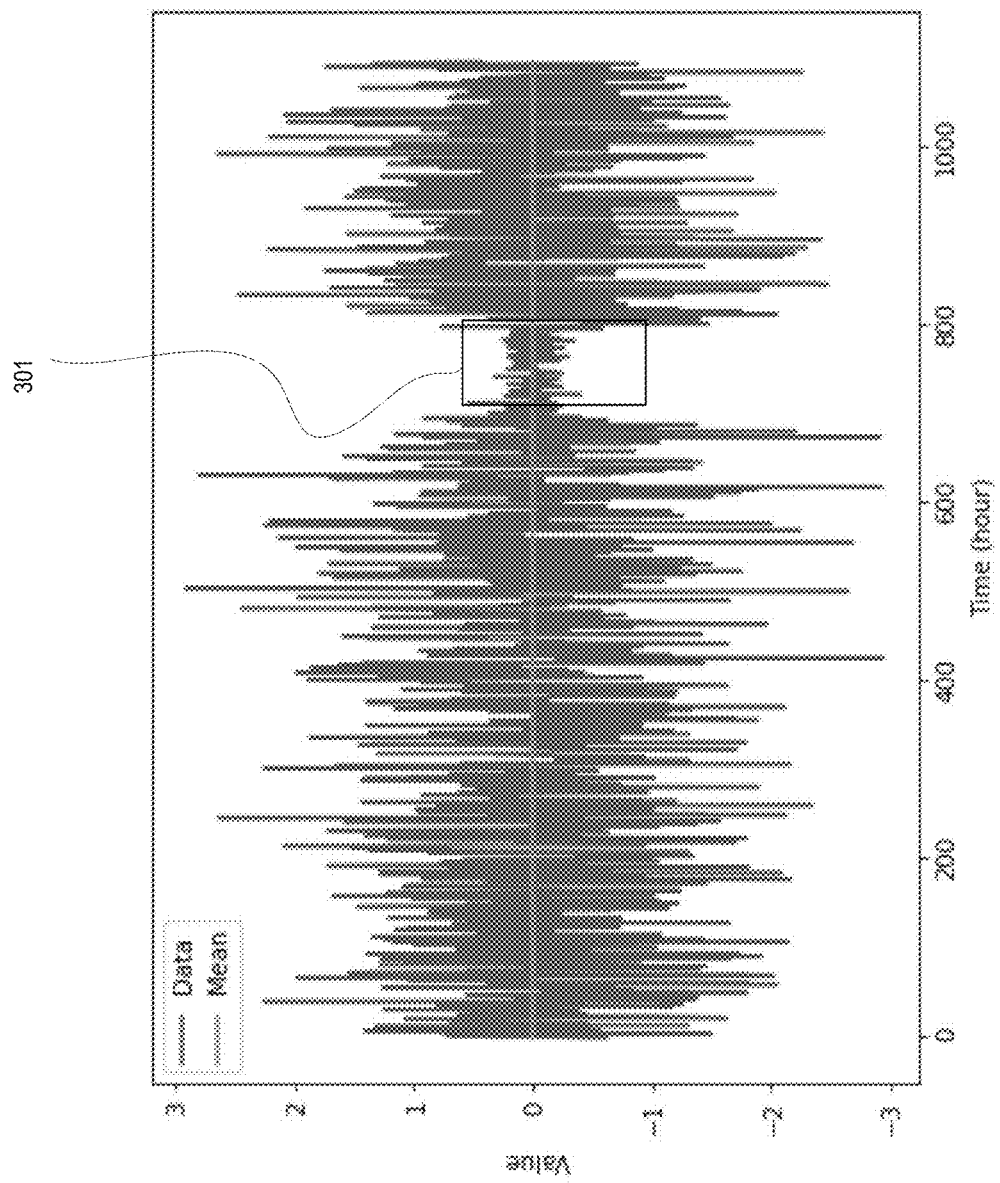
FIG. 3 illustrates an example of anomalous behavior in time-series.

An example of such anomalies is given in FIG. 3. In this example, the box 301 shows where an anomaly is in the distributed time series. The variance of the data distribution decreases drastically: individually, each observation will fall well within the distribution of recent observations and not appear as an outlier; however, observing these m values in a row is highly improbable. Classical time-series anomaly detection algorithms are not able to detect such anomalies.

Figure 4:
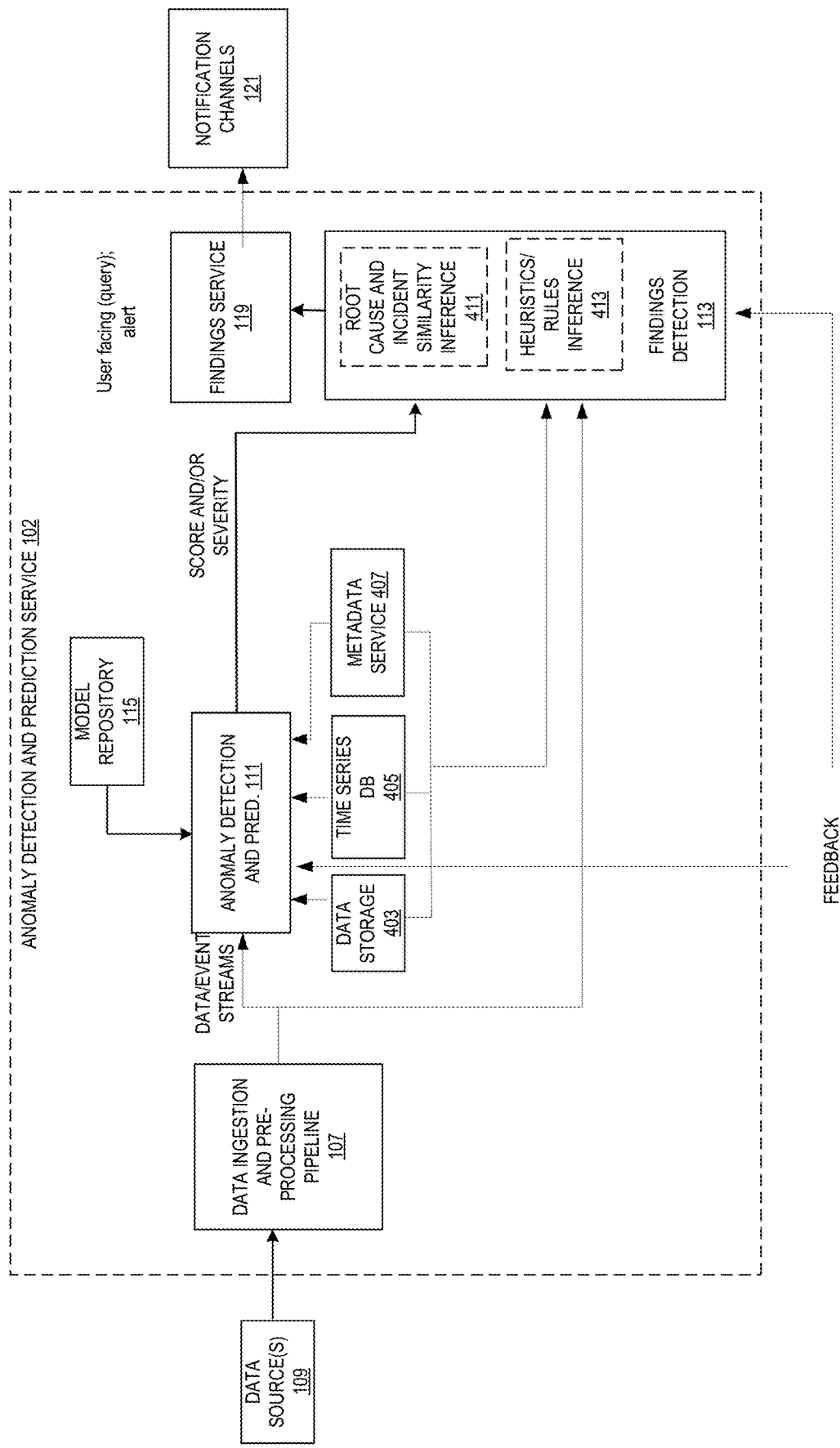
FIG. 4 illustrates more detailed aspects of some embodiments of the anomaly detection service.

FIG. 4 illustrates more detailed aspects of some embodiments of the anomaly detection service 102. In particular, the anomaly detection/prediction component/service 111 is shown to receive data from data storage 403 (e.g., raw data), data from a time-series database 405, and data from a metadata service 407. The metadata service 407 stores and serves user and application metadata. This includes tuning parameters specified by the user.

In some embodiments, a system analysis service 511 (FIG. 5) uses the metadata to understand the structure of the architecture (system) and how components interact using a graph of resources. This structure may then be used by an odd-one-out detector 513 to detect whether a resource works differently than other similar resources.

Incidents, results, and/or alerts from the anomaly detection/prediction component/service 111 are feed into the findings service 119 and the findings detection service 113. In some embodiments, the findings detection service 113 comprises one or more of a rules/heuristic inference service/engine 413 and/or a root cause and incident similarity inference service/engine 411. The rules/heuristic inference service/engine 413 uses rules to analyze the data and anomaly stream to generate alerts and rules-based recommendations. An example of such a heuristic will be to look for systems which are close to the configured limits such max instances in autoscaling group. This service may be a set of heuristic rules that may be augmented by machine learning models. Results and recommendations are sent to a findings service 119 to further propagate to users via one or more notification channels 121.

The root cause and incident similarity inference service/engine 411 analyzes the results of various inference services to infer a probable root cause; finds historical incidents which are similar (which may be added to recommendations to help find a root cause); and/or finds applicable runbooks to help with incident management. In some embodiments, this is accomplished using a set of heuristic rules and/or clustering-based ML models. An example of a heuristic is to present de-duped anomalies in time-based order as a proxy to causality for an incident. The output of root cause and incident similarity inference service/engine 411 is presented to the findings service 119.

In some embodiments, feedback from a user about an alert or recommendation is used to change the anomaly detection/prediction component/service 111 and/or findings detection service 113. For example, in some embodiments, each type of notification (alert, recommendation, etc.) from the findings detection service 113 has an associated weight. Negative feedback may be used to decrease an associated weight (downweight). In some embodiments, a ML model learns what should be marked as a finding (what is an anomaly, an alert, a recommendation, etc.) and what should not be.

Figure 5:
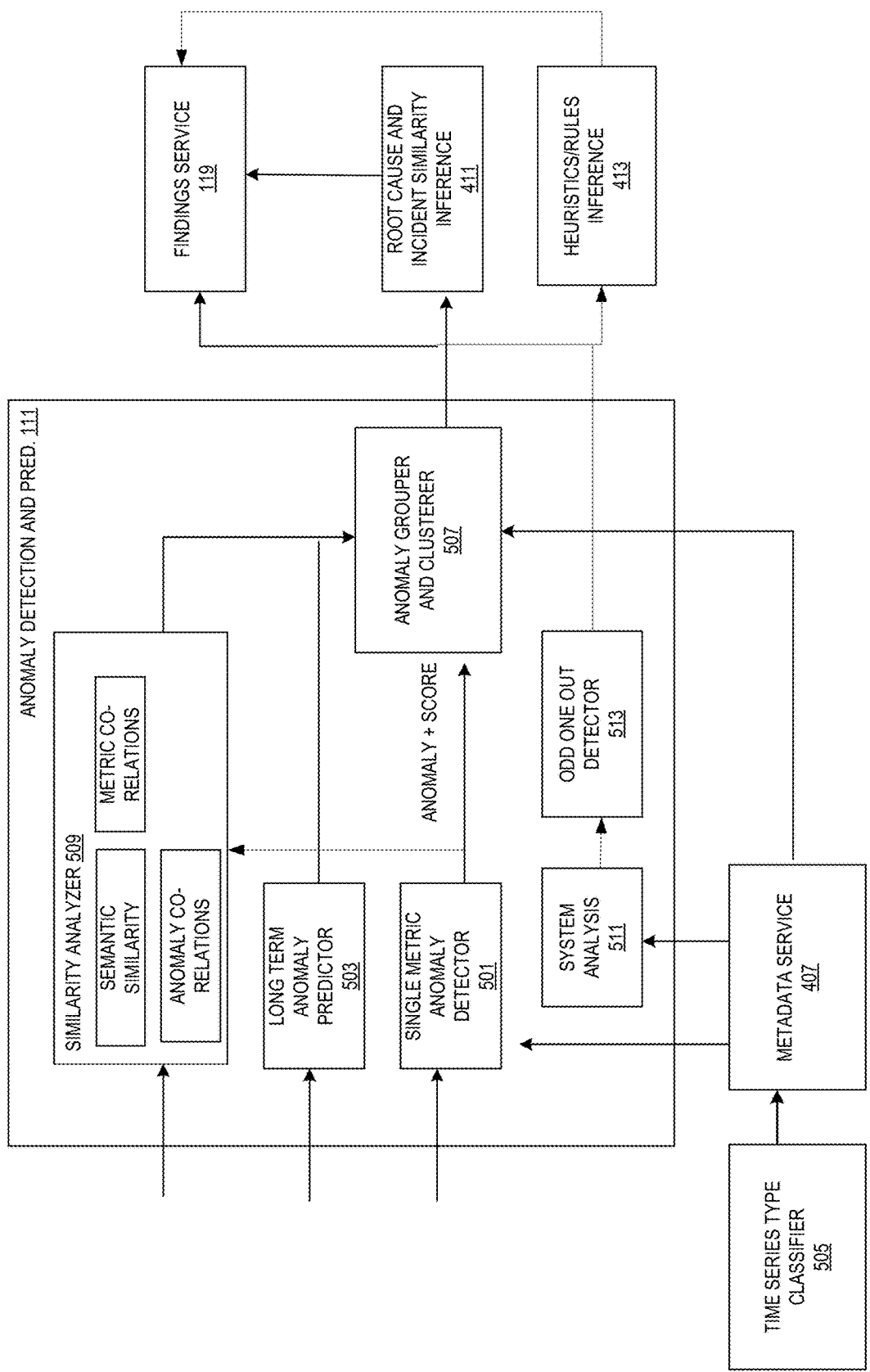
FIG. 5 illustrates more detailed aspects of some embodiments of the anomaly detection/prediction component/service.

FIG. 5 illustrates more detailed aspects of some embodiments of the anomaly detection/prediction component/service 111. The anomaly detection/prediction component/service 111 can be looked at as functioning as a "funnel." The top (entry point) of the funnel is to perform single metric anomaly detection using single metric anomaly detector 501 and perform long-term anomaly predictions using long term anomaly predictor 503. The single metric anomaly detector 501 looks at an individual metric or log to detect anomalies. It may apply different models on different types of time series data. In some embodiments, the time series is classified by a time series type classifier 505. Example of classifications include sparse, discrete, irregularly sampled, etc. This includes point anomalies, contextual anomalies and collective anomalies. The long-term anomaly predictor 503 predicts anomalies that have not happened yet. It is concerned more about proactively predicting rather than reacting to anomalies.

A similarity analyzer 509 looks for similarities between detected anomalies using one or more ML models. Examples of models include, but are not limited to: models for semantic similarity that look for anomalies for metrics that have the same meaning which can them be grouped together (e.g., all CPU metrics for an auto scale group are de-duplicated into a single anomaly); models for anomaly correlation: that determine when certain anomalies have been known to occur together in previous incidents can be combined into one incident; and/or models for metric correlation that group metrics have been known to move together independent of anomalies (e.g., an increased request rate has been known to increase CPU usage).

The next step in the "funnel" is to cluster anomalies into various groups or incidents based on the output of the long-term anomaly predictor 503, the single metric anomaly detection using single metric anomaly detector 501, and the similarity analyzer 509. An anomaly grouper and clusterer 507 uses one or more types of models to perform this grouping and clustering.

Note that anomalies may have a normalized score that can be compared regardless of the model used. This normalized score may be used as first level of filtering to reduce the noise of anomalies.

Once the incidents are generated based on the anomaly groups, the root cause and incident similarity inference service/engine 411 finds similar historic incidents to recommend applicable runbooks. This may also include customer defined rule-based runbooks.

Figure 6:
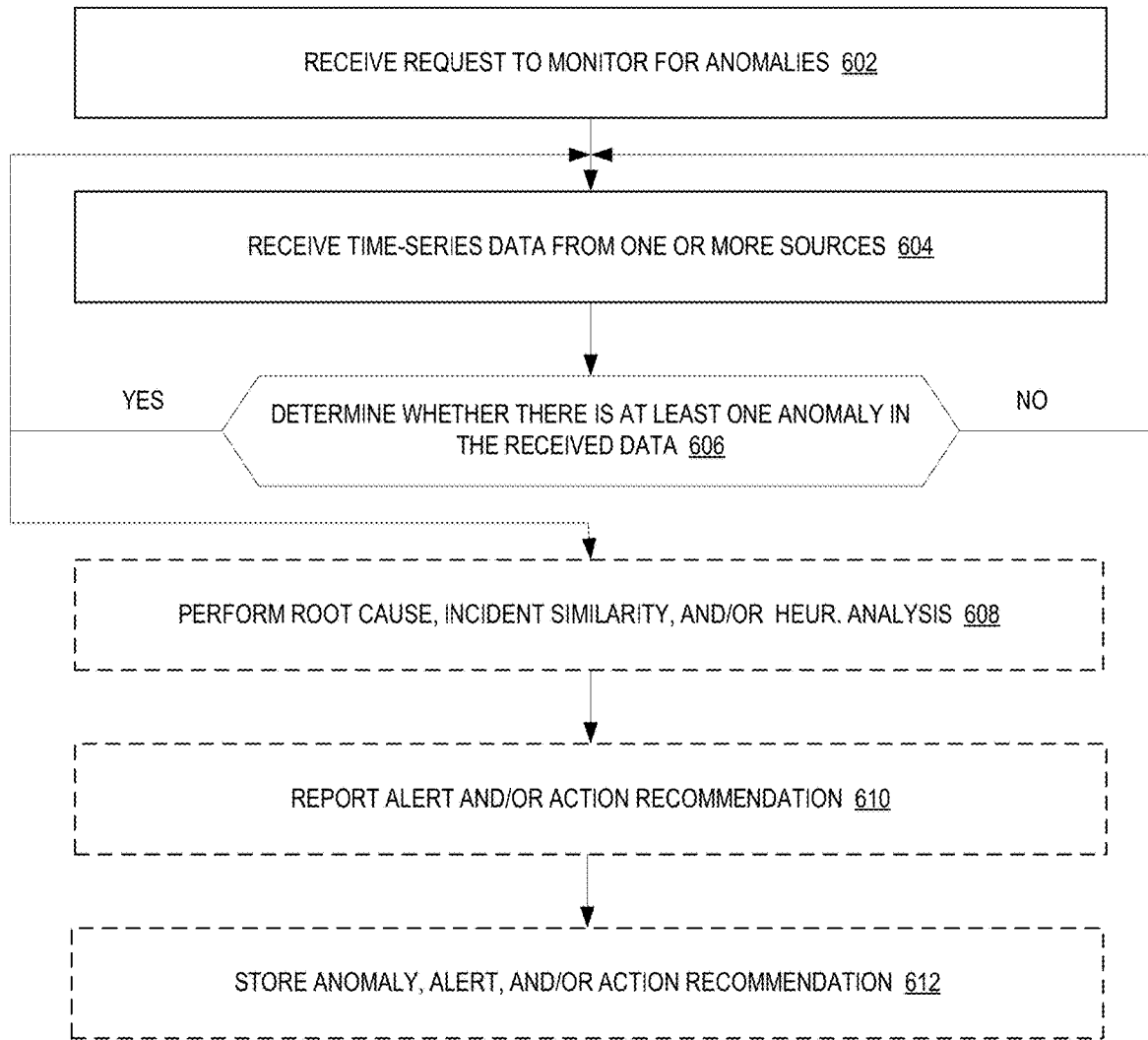
FIG. 6 is a flow diagram illustrating operations of a method for detecting anomalies in time series data and presenting those anomalies according to some embodiments.

FIG. 6 is a flow diagram illustrating operations of a method for detecting anomalies in time series data and presenting those anomalies according to some embodiments. Some or all of the operations (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations are performed by the anomaly detection service 102 of the other figures.

At 602, a request is received to monitor for anomalies. For example, a request is received from a user via external interface 101. This request may include an indication of what data source(s) to monitor (for example, a location of data generated by the source(s), an identifier of the source itself (if streaming), etc.), what model(s) to use (for example, when a particular model has been shown to work better for a certain data source), an indication of how to present results (e.g., what notification channel 121 to use), etc. The anomaly detection service 102, findings service 119, notification channels 121, etc. are configured based on this request. For example, this allows for the configuration of the data ingesting, anomaly detection, finding detection, etc.

At 604, time-series data is received (ingested) from one or more of the data sources that were requested to be monitored. For example, metric data, event data, configuration data, log data, etc. are received. In some embodiments, the ingestion includes one or more of storing the time-series data in a database, storing the raw data, and/or otherwise processing the received data. Note that the data is time-stamped and has a value.

A determination of whether there is at least one anomaly in the received data is made at 606. This determination may include the use of one or more ML models such as those described with respect to FIG. 5. The determination may include the grouping or clustering of anomalies. Incidents, results, and/or alerts may be generated based on any positive anomaly determination.

In some embodiments, root cause, incident similarity, and/or heuristic analysis is performed at 608. Details of such analyses are detailed above. In some embodiments, the model used, score of severity threshold, feedback from a user, etc. may impact these analyses.

At 610, an alert and/or action recommendation is reported out and/or stored.

Figure 7:
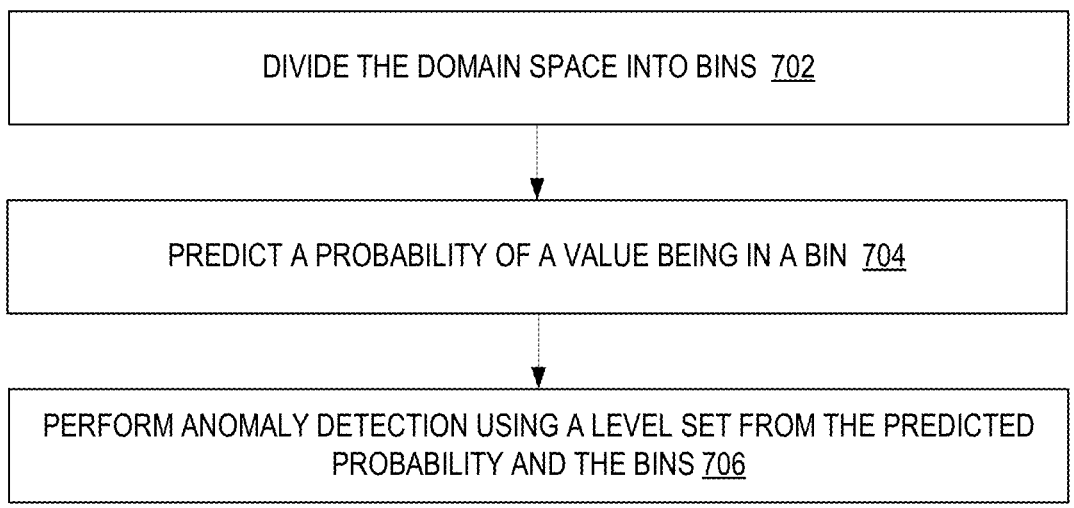
FIG. 7 is a flow diagram illustrating operations of a method for determining an anomaly according to some embodiments.

FIG. 7 is a flow diagram illustrating operations of a method for determining an anomaly according to some embodiments. Some or all of the operations (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations are performed by the anomaly detection and prediction service 111 of the other figures. This may apply to one or more of the single metric anomaly detection, long-term anomaly detection, etc.

Prior to perform these operations, a determination of a representation of the received data is made. In particular, a representation of the distribution of the data. In some embodiments, $F_{1:T}=(F_t)_{t=1,\ldots,T}$ is a time series of univariate distributions. Note this includes the distribution and cumulative distribution function (cdf). The densities will be denoted $f_{1:T}$ and it is assumed that all the distributions have support within the set (domain space) $\mathbb{Y}=[y_{min}, y_{max}]$.

Note that the distribution can be approximated during training. In some embodiments, this is considered a histogram. For anomaly detection, a model that is simple enough to run efficiently, but that is still able to identify abnormal behaviors is a good choice. To use such a model, the cdf $F_t$ is approximated by a piece-wise linear function $\tilde{F}_t$, composed of d linear pieces. In some embodiments, this is done with a grid on the domain space $\mathbb{Y}$.

The domain space is divided into bins using the approximation at 702. Note this is done as data is received. For example, Y is divided into d bins using the grid $y_{min}=a_0<a_1<\ldots<a_d=y_{max}$. $\tilde{F}_t$ is the piece-wise linear cdf that interpolates the points $(a_k, F_t(a_k))_{k=0,\ldots,d}$. Therefore, the corresponding density function $\tilde{f}_t$ is piece-wise constant, and within each bin $[a_{k-1}, a_k)$, it is equal to $$p_{tk}=F_t(a_k)-F_t(a_{k-1}).$$

Specifying a distribution on the d dimensional vector $p_t=(p_{t1},\ldots,p_{td})$ entails a distribution over the piece-wise linear cdfs $\tilde{F}_t$. A natural choice of such a prior is the Dirichlet distribution. Hence, we will assume that $p_t \sim \text{Dir}(\alpha_t)$, with concentration vector $\alpha_t \in \mathbb{R}_+^d$.

This can be simplified by the notation ~ dropped by assuming that $F_t$ are piece-wise linear. For simplicity, it is also assumed that $\mathbb{Y}=[0,1]$.

Denoting $\mathcal{L}(Y_{t1}; F_t)$ the likelihood of $Y_{t1}$ given $F_t$, one can write $$\mathcal{L}_{(Y_{t1};F_t)} \propto \text{Cat}((\mathbb{1}\{Y_{t1}\in[a_{k-1},a_k)\})_{k=1,\ldots,d};p_t),$$

where $\propto$ means that the quantities are proportional, $\mathbb{1}\{A\}$ denotes the indicator of the event A, and $\text{Cat}(.; p_t)$ refers to the categorical distribution with parameter $p_t$ as well as its likelihood. Hence, denoting $m_{tk}=\Sigma_{i-1}^{n_t}\mathbb{1}\{Y_{t1}\in[a_{k-1}, a_k)\}$, and the vector $m_t=(m_{t1},\ldots, m_{td})$, it comes that $$\mathcal{L}_{(Y_t;F_t)} \propto \text{Mult}(m_t;n_t,p_t)$$

where $\text{Mult}(.; n_t, p_t)$ refers to the Multinomial distribution with $n_t$ number of trials and probabilities vector $p_t$. Therefore, it is sufficient to track the evolution of the count vectors $m_t$ instead of the sets $Y_t$. Since $p_t$ is Dirichlet-distributed, it can be marginalized out and there is a closed form probability mass function for the observations $m_t$. More precisely, $m_t$ follows a Dirichlet-Multinomial distribution with $n_t$ number of trials and concentration vector $\alpha_t$.

To summarize, given $\alpha_t$, the likelihood of the observation is:

$$\mathcal{L}_t=\mathcal{L}_{(p_t;\alpha_t)}=\text{Dir}(p_t;\alpha_t) \quad \text{(Asymptotic setting)}$$

$$\mathcal{L}_t=\mathcal{L}_{(m_t;n_t,\alpha_t)}=\text{DirMult}(m_t;n_t,\alpha_t), \quad \text{(Finite } n_t \text{ setting)}$$

whereas in the asymptotic regime $p_t$ is directly observed which is equal to the normalized counts $$\frac{1}{n_t}m_t.$$

At 704 a probability of a value being in a bin is predicted. This determines when a single value is in a bin and whether pattern over a longer range of time matches (i.e., a distributional anomaly). The dynamic of the model is thus captured by the evolution of the parameter $\alpha_t$, and it is this dynamic that is to be learned. Let $z_{1:T}$ be the sequence of observations, either $p_{1:T}$ or $m_{1:T}$ depending on the setting. Denote $\emptyset$ the parameters of the model. Given a horizon T, the aim is to predict the probability distribution of future trajectories $z_{T+1:T_H}$, with the potential use of observed covariates $x_{1:T_H}$. In some embodiments, to do this, a recurrent neural network (RNN) (e.g., an autoregressive LSTM-based RNN) is sued.

Figure 8:
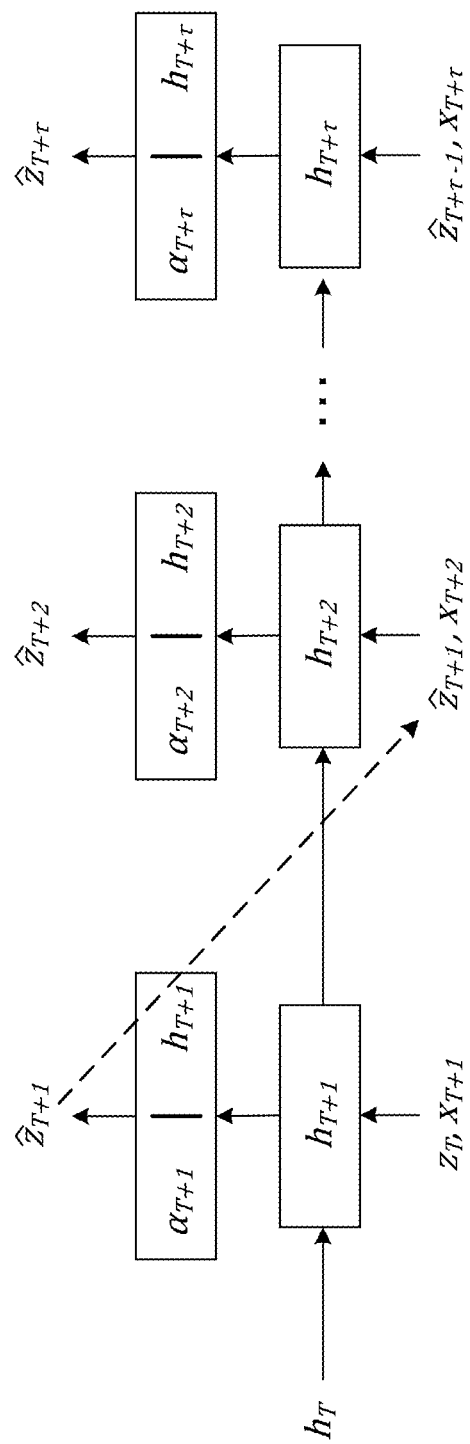
FIG. 8 illustrates an example of a model architecture for prediction.

FIG. 8 illustrates an example of a model architecture for prediction. The parameter $\alpha_t$ is function of the output $h_t$ of an autoregressive recurrent neural network with $$h_t=r_\emptyset(h_{t-1},z_{t-1},x_t)$$

$$\alpha_t=\theta_\emptyset(h_t)$$

where $r_\emptyset$ is a multi-layer recurrent neural network with LSTM cells. The model is autoregressive and recurrent in the sense that is uses respectively the observation at the last time step $z_{t-1}$ and the previous hidden state $h_{t-1}$ as input. Then a layer $\theta_\emptyset$ projects the output $h_t$ to $\mathbb{R}_+^d$, the domain of $\alpha_t$. The parameters $\emptyset$ of the model are chosen to minimize the negative log likelihood:

$$L=-\sum_{t=1}^T \log \mathcal{L}_t.$$

Based on this prediction (forecast), anomaly detection is performed at 706. Once a forecast of $\alpha_{T+1}$ has been made, one can assess whether the observation $z_{T+1}$ is a potential anomaly. Indeed, given $\alpha_{T+1}$, the distribution of the random variable $Z_{T+1}$, of which $z_{T+1}$ should be a sample if no anomaly happened is known. Consequently, a credible region $C_{T+1}$ with total mass $1-\varepsilon$ for a given level $\varepsilon$ can be calculated. If $z_{T+1} \notin C_{T+1}$, that observation is an anomaly. The difficulty when considering credible regions is that they are not unique. Even though this problem exists for an univariate setting, it can be easily circumvented and natural credible intervals can be designed. In a multivariate setting, this issue is more challenging and one needs to choose meaningful credible regions. The credible regions considered in some embodiments are the level-sets of the likelihood, defined by:

$$S_{T+1}(\eta)=\{z: \mathcal{L}_{T+1}[z]\geq\eta)\}.$$

Then take $\eta_{T+1}$ such that $$\mathbb{P}(Z_{T+1}\in S_{T+1}(\eta_{T+1}))=1-\varepsilon,$$

and $C_{T+1}=S_{T+1}(\eta_{T+1})$. In other words, the credible region will be the highest density region that achieves a total mass of $1-\varepsilon$, and the observation will be considered as an anomaly if $\mathcal{L}_{T+1}(z_{T+1})<\eta_{T+1}$. The remaining difficulty is to compute $\eta_{T+1}$. This theoretically requires computing the mass of the level-sets, and then invert the function $n \mapsto \mathbb{P}(Z_{T+1} \in S_{T+1}(\eta))$. When the number of possible outcomes for $Z_{T+1}$ is finite and relatively small, this can be done exactly by computing the likelihoods of all outcomes. Otherwise, an approximation is made such that an inverse function by means of a Monte Carlo method. If the univariate random variable is defined as $\mathcal{L}_{T+1}(z_{T+1})$, $\eta_{T+1}$ can be interpreted as the E quantile of that distribution. Therefore, the following estimator $\hat{\eta}_{T+1}$ is created where a first of sample M realizations of $Z_{T+1}$ is made, then the associate M likelihoods are computed, and finally $\hat{\eta}_{T+1}$ is taken with the E quantile of their empirical distribution.

Figure 9:
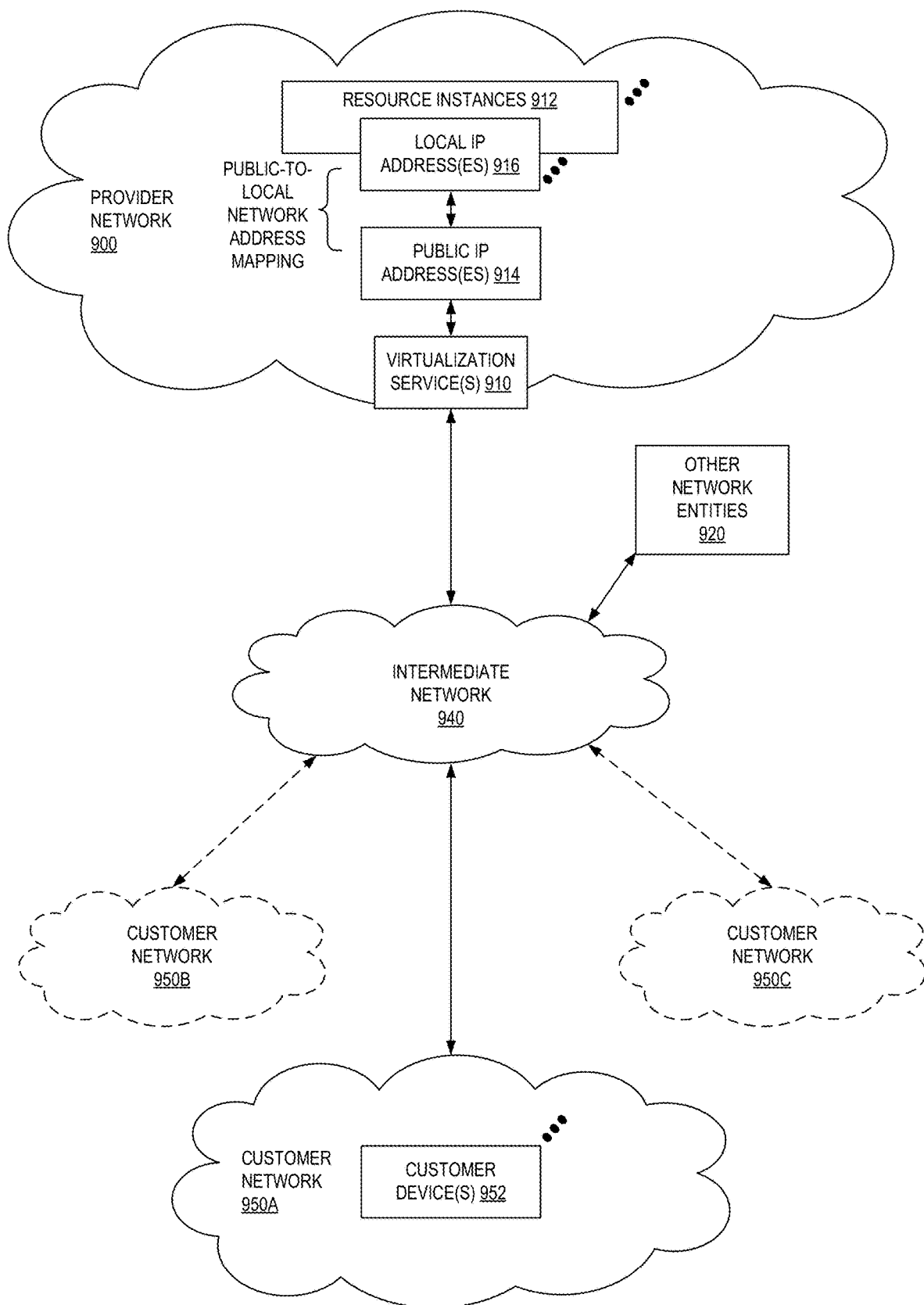
FIG. 9 illustrates an example provider network environment according to some embodiments.

FIG. 9 illustrates an example provider network (or "service provider system") environment according to some embodiments. A provider network 900 may provide resource virtualization to customers via one or more virtualization services 910 that allow customers to purchase, rent, or otherwise obtain instances 912 of virtualized resources, including but not limited to computation and storage resources, implemented on devices within the provider network or networks in one or more data centers. Local Internet Protocol (IP) addresses 916 may be associated with the resource instances 912; the local IP addresses are the internal network addresses of the resource instances 912 on the provider network 900. In some embodiments, the provider network 900 may also provide public IP addresses 914 and/or public IP address ranges (e.g., Internet Protocol version 4 (IPv4) or Internet Protocol version 6 (IPv6) addresses) that customers may obtain from the provider 900.

Conventionally, the provider network 900, via the virtualization services 910, may allow a customer of the service provider (e.g., a customer that operates one or more client networks 950A-950C including one or more customer device(s) 952) to dynamically associate at least some public IP addresses 914 assigned or allocated to the customer with particular resource instances 912 assigned to the customer. The provider network 900 may also allow the customer to remap a public IP address 914, previously mapped to one virtualized computing resource instance 912 allocated to the customer, to another virtualized computing resource instance 912 that is also allocated to the customer. Using the virtualized computing resource instances 912 and public IP addresses 914 provided by the service provider, a customer of the service provider such as the operator of customer network(s) 950A-950C may, for example, implement customer-specific applications and present the customer's applications on an intermediate network 940, such as the Internet. Other network entities 920 on the intermediate network 940 may then generate traffic to a destination public IP address 914 published by the customer network(s) 950A-950C; the traffic is routed to the service provider data center, and at the data center is routed, via a network substrate, to the local IP address 916 of the virtualized computing resource instance 912 currently mapped to the destination public IP address 914. Similarly, response traffic from the virtualized computing resource instance 912 may be routed via the network substrate back onto the intermediate network 940 to the source entity 920.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 900; a customer may then assign their allocated public IP addresses to particular resource instances allocated to the customer. These public IP addresses may be referred to as customer public IP addresses, or simply customer IP addresses. Instead of being assigned by the provider network 900 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 10:
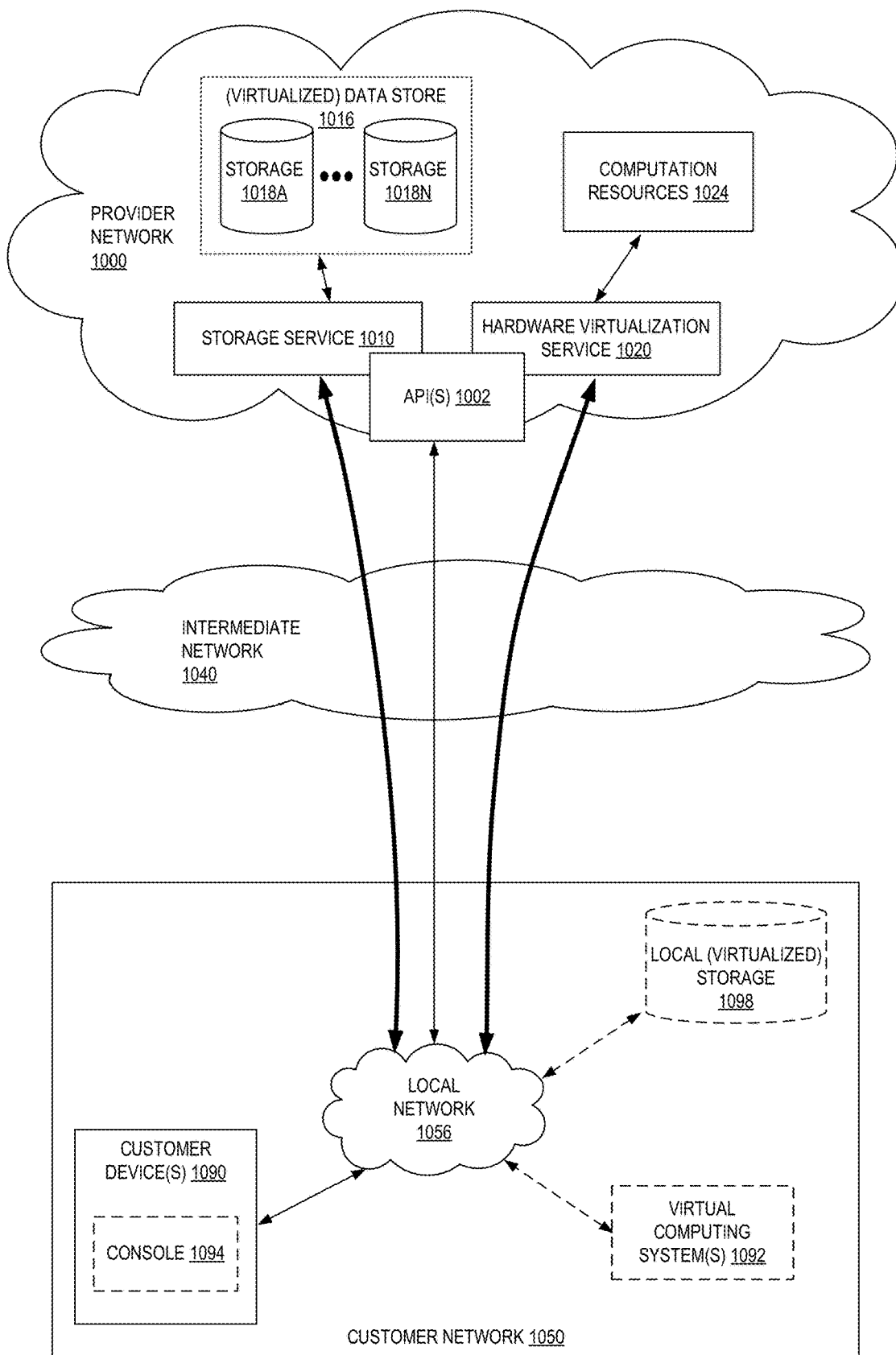
FIG. 10 is a block diagram of an example provider network that provides a storage service and a hardware virtualization service to customers according to some embodiments.

FIG. 10 is a block diagram of an example provider network that provides a storage service and a hardware virtualization service to customers, according to some embodiments. Hardware virtualization service 1020 provides multiple computation resources 1024 (e.g., VMs) to customers. The computation resources 1024 may, for example, be rented or leased to customers of the provider network 1000 (e.g., to a customer that implements customer network 1050). Each computation resource 1024 may be provided with one or more local IP addresses. Provider network 1000 may be configured to route packets from the local IP addresses of the computation resources 1024 to public Internet destinations, and from public Internet sources to the local IP addresses of computation resources 1024.

Provider network 1000 may provide a customer network 1050, for example coupled to intermediate network 1040 via local network 1056, the ability to implement virtual computing systems 1092 via hardware virtualization service 1020 coupled to intermediate network 1040 and to provider network 1000. In some embodiments, hardware virtualization service 1020 may provide one or more APIs 1002, for example a web services interface, via which a customer network 1050 may access functionality provided by the hardware virtualization service 1020, for example via a console 1094 (e.g., a web-based application, standalone application, mobile application, etc.). In some embodiments, at the provider network 1000, each virtual computing system 1092 at customer network 1050 may correspond to a computation resource 1024 that is leased, rented, or otherwise provided to customer network 1050.

From an instance of a virtual computing system 1092 and/or another customer device 1090 (e.g., via console 1094), the customer may access the functionality of storage service 1010, for example via one or more APIs 1002, to access data from and store data to storage resources 1018A-1018N of a virtual data store 1016 (e.g., a folder or "bucket", a virtualized volume, a database, etc.) provided by the provider network 1000. In some embodiments, a virtualized data store gateway (not shown) may be provided at the customer network 1050 that may locally cache at least some data, for example frequently-accessed or critical data, and that may communicate with storage service 1010 via one or more communications channels to upload new or modified data from a local cache so that the primary store of data (virtualized data store 1016) is maintained. In some embodiments, a user, via a virtual computing system 1092 and/or on another customer device 1090, may mount and access virtual data store 1016 volumes via storage service 1010 acting as a storage virtualization service, and these volumes may appear to the user as local (virtualized) storage 1098.

While not shown in FIG. 10, the virtualization service(s) may also be accessed from resource instances within the provider network 1000 via API(s) 1002. For example, a customer, appliance service provider, or other entity may access a virtualization service from within a respective virtual network on the provider network 1000 via an API 1002 to request allocation of one or more resource instances within the virtual network or within another virtual network.

Illustrative Systems

Figure 11:
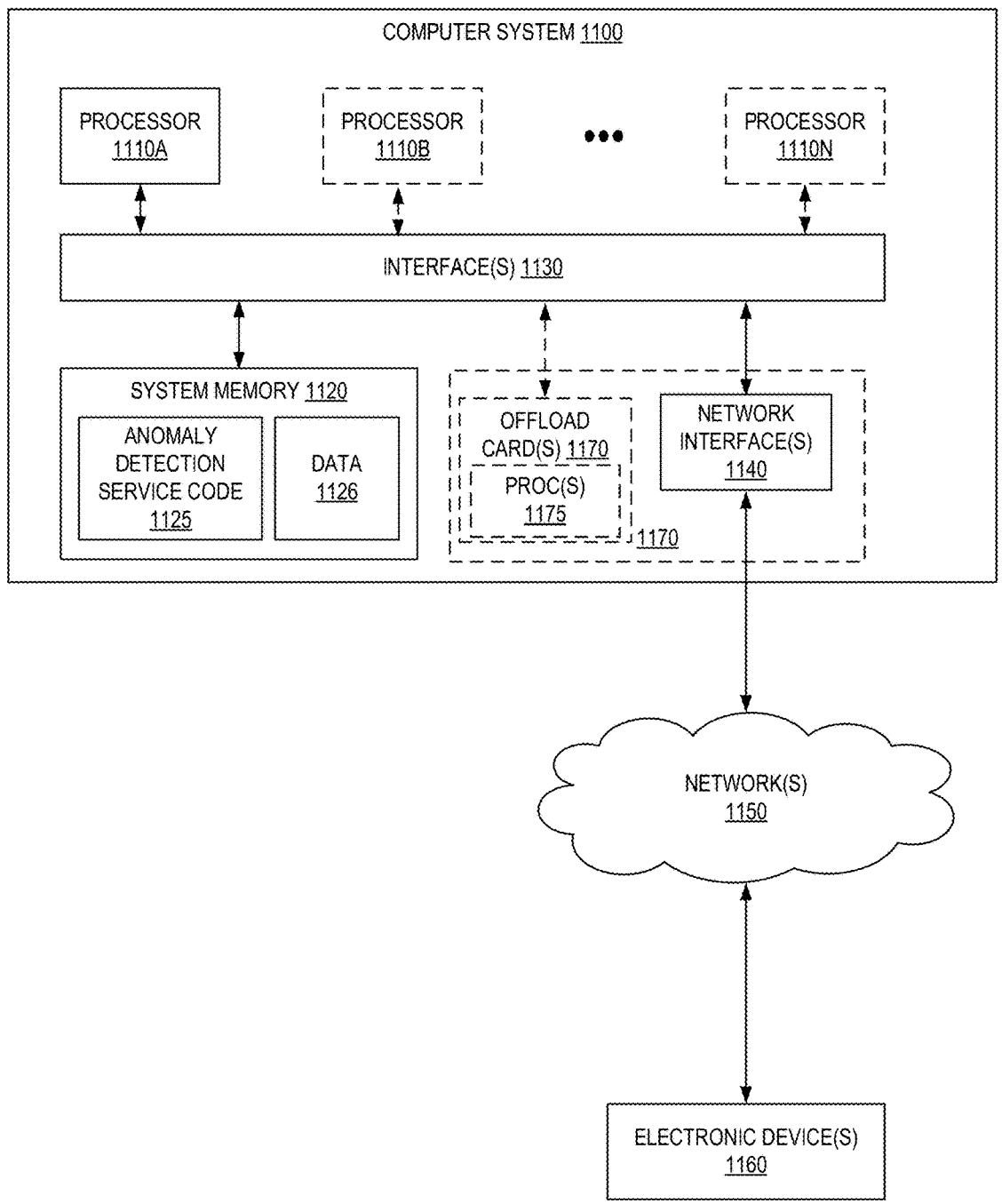
FIG. 11 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 1100 illustrated in FIG. 11. In the illustrated embodiment, computer system 1100 includes one or more processors 1110 coupled to a system memory 1120 via an input/output (I/O) interface 1130. Computer system 1100 further includes a network interface 1140 coupled to I/O interface 1130. While FIG. 11 shows computer system 1100 as a single computing device, in various embodiments a computer system 1100 may include one computing device or any number of computing devices configured to work together as a single computer system 1100.

In various embodiments, computer system 1100 may be a uniprocessor system including one processor 1110, or a multiprocessor system including several processors 1110 (e.g., two, four, eight, or another suitable number). Processors 1110 may be any suitable processors capable of executing instructions. For example, in various embodiments, processors 1110 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1110 may commonly, but not necessarily, implement the same ISA.

System memory 1120 may store instructions and data accessible by processor(s) 1110. In various embodiments, system memory 1120 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1120 as anomaly detection service code 1125 (e.g., executable to implement, in whole or in part, the anomaly detection service 102) and data 1126.

In one embodiment, I/O interface 1130 may be configured to coordinate I/O traffic between processor 1110, system memory 1120, and any peripheral devices in the device, including network interface 1140 or other peripheral interfaces. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. Also, in some embodiments some or all of the functionality of I/O interface 1130, such as an interface to system memory 1120, may be incorporated directly into processor 1110.

Network interface 1140 may be configured to allow data to be exchanged between computer system 1100 and other devices 1160 attached to a network or networks 1150, such as other computer systems or devices as illustrated in FIG. 1, for example. In various embodiments, network interface 1140 may support communication via any suitable wired or wireless general data networks, such as types of Ethernet network, for example. Additionally, network interface 1140 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1100 includes one or more offload cards 1170 (including one or more processors 1175, and possibly including the one or more network interfaces 1140) that are connected using an I/O interface 1130 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 1100 may act as a host electronic device (e.g., operating as part of a hardware virtualization service) that hosts compute instances, and the one or more offload cards 1170 execute a virtualization manager that can manage compute instances that execute on the host electronic device. As an example, in some embodiments the offload card(s) 1170 can perform compute instance management operations such as pausing and/or un-pausing compute instances, launching and/or terminating compute instances, performing memory transfer/copying operations, etc. These management operations may, in some embodiments, be performed by the offload card(s) 1170 in coordination with a hypervisor (e.g., upon a request from a hypervisor) that is executed by the other processors 1110A-1110N of the computer system 1100. However, in some embodiments the virtualization manager implemented by the offload card(s) 1170 can accommodate requests from other entities (e.g., from compute instances themselves), and may not coordinate with (or service) any separate hypervisor.

In some embodiments, system memory 1120 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1100 via I/O interface 1130. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1100 as system memory 1120 or another type of memory. Further, a computer-accessible medium may include transmission media or signals such as electrical, electromagnetic, or digital signals, conveyed via a communication medium such as a network and/or a wireless link, such as may be implemented via network interface 1140.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C # or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   receiving, at an anomaly detection service in a multi-tenant provider network, a request to monitor for anomalies from one or more data sources;
   analyzing, by an anomaly detection component of the anomaly detection service, time-series data from the one or more data sources by:
   ingesting the time-series data from the one or more data sources, wherein the time-series data is time-stamped and has at least one value, and
   determining there is an anomaly in the time-series data using at least one distributional time series model by:
   dividing a domain space into a plurality of bins using an approximation,
   predicting a probability of a value being in one of the plurality of bins using a recurrent neural network, and
   performing anomaly detection using the probability and the bins;
   generating, by a findings detection service of the anomaly detection service, a recommendation for handling the anomaly, the recommendation generated by performing one or more of a root cause analysis, a heuristic analysis, and an incident similarity analysis; and
   reporting, by a findings service in the multi-tenant provider network, the anomaly and the recommendation to a user.

2. The computer-implemented method of claim 1, wherein the time-series data includes at least one of log data, metric data, event data, and configuration data.

3. The computer-implemented method of claim 1, wherein the ingesting comprises:
   pre-processing the received data to put it in a form for the at least one distributional time series model;
   storing the pre-processed data; and
   storing the received data in a raw form.

4. A computer-implemented method comprising:
   receiving, at an anomaly detection service in a multi-tenant provider network, a request to monitor for anomalies from one or more data sources;
   ingesting, by the anomaly detection service, time-series data from the one or more data sources;
   determining, by the anomaly detection service, there is an anomaly in the time-series data using at least one distributional time series model by:
   dividing a domain space into a plurality of bins using an approximation,
   predicting a probability of a value of the time-series data being in one of the plurality of bins using a recurrent neural network, and
   performing anomaly detection using the probability and the bins;
   generating, by the anomaly detection service, a recommendation for handling the anomaly, the recommendation generated by performing one or more of a root cause analysis, a heuristic analysis, and an incident similarity analysis; and
   reporting, by a findings service in the multi-tenant provider network, the anomaly and the recommendation.

5. The computer-implemented method of claim 4, wherein the analyzing time-series data from the one or more data sources comprises performing one or more of:
   single metric anomaly detection on an individual log or metric;
   long-term anomaly detection to predict anomalies that have not yet occurred; and
   an odd-one-out detection to determine resources that have inconsistent use compared to similar resources.

6. The computer-implemented method of claim 4, wherein the time-series data includes at least one of log data, metric data, event data, and configuration data.

7. The computer-implemented method of claim 4, wherein the recommendation includes contextual information about the anomaly and a suggested action.

8. The computer-implemented method of claim 4, wherein the ingesting comprises:
- pre-processing the received data to perform one or more of extracting relevant data, aggregating relevant data, and seasonality evaluation;
- storing the pre-processed data; and
- storing the received data in a raw form.

9. The computer-implemented method of claim 4, wherein reporting the anomaly and the recommendation comprises sending the anomaly and the recommendation using a notification channel as indicated by the request.

10. The computer-implemented method of claim 4, further comprising:
- storing the anomaly and recommendation for later querying.

11. The computer-implemented method of claim 4, wherein the request is received via an external interface that allows for configuration of the ingestion of the time-series data, the analyzing of the ingested time-series data, and the generating of the recommendation.

12. The computer-implemented method of claim 4, wherein models to be used in the analyzing of the time-series data from the one or more data sources are stored in a model repository and the models are adjustable based on user feedback.

13. A system comprising:
- one or more electronic devices implementing an anomaly detection service in a multi-tenant provider network, the anomaly detection service including instructions that upon execution by one or more processors cause the anomaly detection service to:
  - receive a request to monitor for anomalies from one or more of the plurality of services;
  - ingest time-series data from the one or more data sources;
  - determine there is an anomaly in the time-series data using at least one distributional time series model by:
    - dividing a domain space into a plurality of bins using an approximation,
    - predicting a probability of a value of the time-series data being in one of the plurality of bins using a recurrent neural network, and
    - performing anomaly detection using the probability and the bins;
  - generate, by a findings detection service of the anomaly detection service, a recommendation for handling the determined anomaly, the recommendation generated by performing one or more of a root cause analysis, a heuristic analysis, and an incident similarity analysis; and
  - report, by a findings service in the multi-tenant provider network, the anomaly and recommendation.

14. The system of claim 13, wherein to analyze time-series data from the one or more data sources comprises performing one or more of:
- single metric anomaly detection on an individual log or metric;
- long-term anomaly detection to predict anomalies that have not yet occurred; and
- an odd-one-out detection to determine resources that have inconsistent use compared to similar resources.

15. The system of claim 13, wherein the time-series data includes at least one of log data, metric data, event data, and configuration data.

16. The system of claim 13, wherein the recommendation includes contextual information about the anomaly and a suggested action.

17. The system of claim 13, wherein to report the anomaly and recommendation comprises to send the anomaly and recommendation using a notification channel as indicated by the received request.

18. The system of claim 13, wherein the ingesting time-series data from the one or more data sources comprises:
- pre-processing the received data to perform one or more of extracting relevant data, aggregating relevant data, and seasonality evaluation;
- storing the pre-processed data; and
- storing the received data in a raw form.

19. The system of claim 13, wherein reporting the anomaly and the recommendation comprises sending the anomaly and the recommendation using a notification channel as indicated by the request.

20. The system of claim 13, wherein the request is received via an external interface that allows for configuration of the ingestion of the time-series data, the analyzing of the ingested time-series data, and the generating of the recommendation.

* * * * *